No. 836,806. PATENTED NOV. 27, 1906.
J. R. DUNN.
CATTLE STANCHION.
APPLICATION FILED MAY 19, 1906.
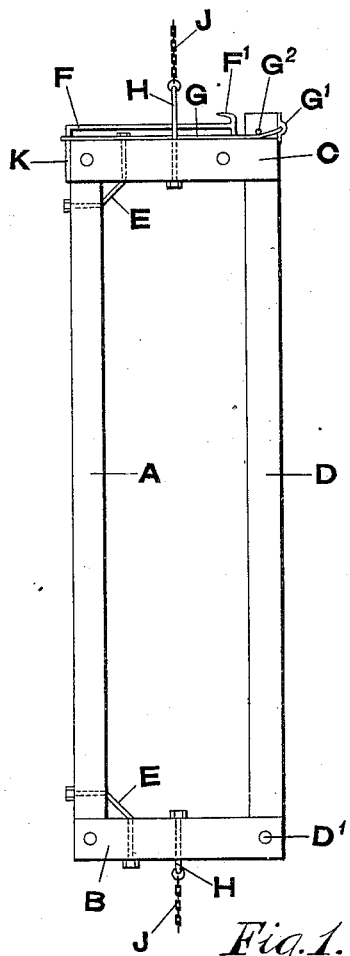
Fig. 1.
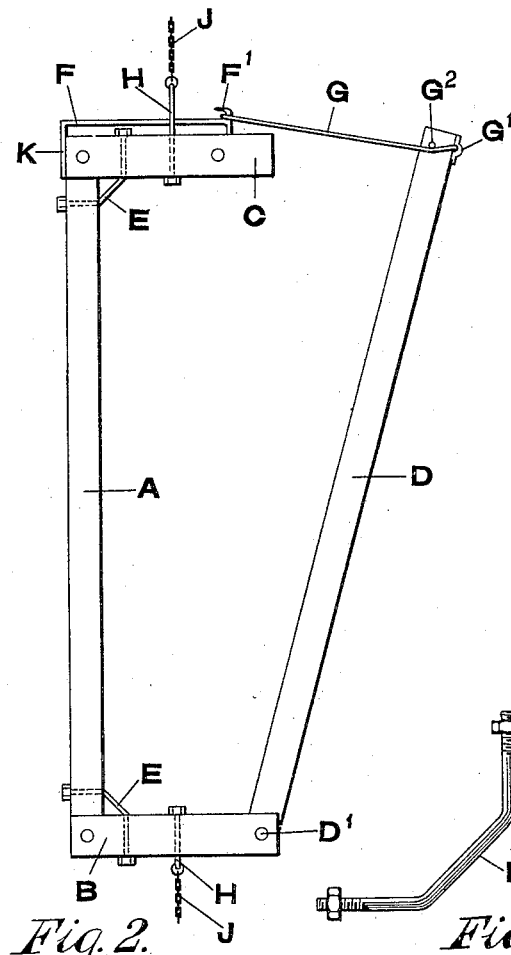
Fig. 2. Fig. 7.
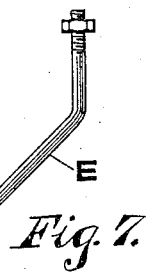
Fig. 4.
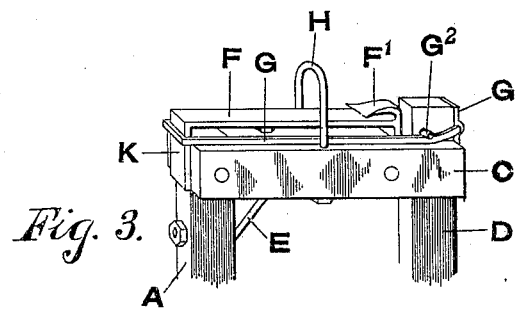
Fig. 3.
Fig. 5.
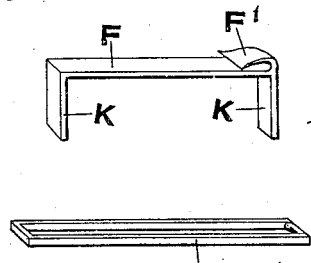
Fig. 6.
Witnesses
Inventor
James R. Dunn.

UNITED STATES PATENT OFFICE.

JAMES ROBERT DUNN, OF LYONS BROOK, NOVA SCOTIA, CANADA.

CATTLE-STANCHION.

No. 836,806.     Specification of Letters Patent.     Patented Nov. 27, 1906.

Application filed May 19, 1906. Serial No. 317,819.

*To all whom it may concern:*

Be it known that I, JAMES ROBERT DUNN, of the village of Lyons Brook, in the Province of Nova Scotia and Dominion of Canada, have invented certain new and useful Improvements in Cattle-Stanchions, of which the following is a full, clear, and exact description.

My invention relates to stanchions for cattle or other animals; and the object is to provide a simple and inexpensive device that can be operated easily and quickly to secure an animal in position in a stall.

A further object is to provide a stanchion that will allow an animal a certain freedom of movement for the head that has not heretofore been possible.

A still further object is to provide a device that can be quickly unlocked to release the cattle in case of fire or other accident.

My invention consists, essentially, of an upright rectangular frame of wood or other suitable material freely suspended at both the top and bottom by means of a chain or similar device. One side of the frame is pivoted at its lower end and is adapted to swing outwardly within certain limits and to be automatically secured in position by means of a suitable locking mechanism.

In the drawings which illustrate the preferred form of my device, Figure 1 is an elevation of the stanchion in a locked or closed position. Fig. 2 is an elevation of the stanchion in an unlocked or open position. Fig. 3 is a detail perspective view of the locking mechanism. Fig. 4 is a perspective view of part of the locking device. Fig. 5 is a perspective view of the spring-link. Fig. 6 is a plan view of the clevis which is attached to the top and bottom members. Fig. 7 is a plan view of one of the angle-braces.

Referring to the parts, A designates a rigid bar of suitable material, at right angles to which are rigidly attached the bottom and top members B and C. The fourth side of the rectangular frame (shown in Fig. 1) is completed by the closure member D, which is pivoted to the bottom member B by means of a suitable pin D'. The outer extremity of the top member C is forked or recessed, and the member is adapted when in the closed position to fit into this recess, as shown in Figs. 1 and 3. A locking member F, having downwardly-turned flanges K, is attached to the member C in such a manner that one of the flanges fits into the recess at the outer extremity, while the other flange fits over the opposite end of the bar. The member F is provided at its outer end with an upwardly-turned hook F', the use of which will be presently explained. A spring-link G is attached to the upper end of the bar D by means of a cap G' and is held in downward tension by means of a pin $G^2$, which passes through the bar D. The opposite end of the link G rests upon the member F and is held in its open position by the hook F'. To close the bar D, it is only necessary to slide the link toward the opposite end of the member F, when it will be sprung over the flange K by means of the pin $G^2$.

The braces E serve to hold the members A, B, and C in rigid position. A clevis H is secured to each of the members B and C, and the frame is suspended from the top and bottom by means of the chains J, attached to the clevises.

The operation of the device will be apparent from the foregoing description, and the advantages of this form of stanchion will be obvious to all. As the frame is freely suspended at both ends, it will turn in either direction with the movement of an animal's head from side to side and will further be capable of a certain limited movement in a forward and backward direction.

The ease and rapidity with which the animal can be secured or released are also of great advantage.

While I have shown the preferred form of my device, I do not wish to limit myself to the precise form shown, as several modifications in construction may be made without departing from the spirit of my invention.

Having thus described my invention, so that the same may be readily understood by those skilled in the art to which it appertains, what I claim, and desire to secure by Letters Patent, is—

1. In a cattle-stanchion, a rectangular frame comprising fixed end rails and a fixed side rail, a closure member pivotally mounted on the lower end rail, a hooked plate mounted on the upper end rail, a slotted spring-link mounted on the upper end of said closure member, a fulcrum-pin in the closure member above the link for holding it in downward tension and in engagement with the hooked plate, a cap for retaining said link in position on the closure member, and chains attached to the end rails of the stanchion for suspending it in a vertical position.

2. In a cattle-stanchion, a rectangular frame comprising opposite end rails, a fixed vertical side rail rigidly attached to said end rails, an opposite side rail pivoted at its lower end to the bottom end rail and adapted to fit into the forked end of the top end rail, a slotted spring-link mounted on the upper end of said pivoted member, a hooked plate fixed to the top end rail and adapted to engage with said link, a pin mounted above said link and adapted to maintain it in downward tension, clevises attached to the bottom and top of said stanchion, and chains for suspending the stanchion in a vertical position.

In witness whereof I have hereunto set my hand in the presence of two witnesses.

JAMES ROBERT DUNN.

Witnesses:
　KATE F. HOGG,
　JOHN H. HOGG.